(12) United States Patent
Master

(10) Patent No.: US 7,021,644 B1
(45) Date of Patent: Apr. 4, 2006

(54) TOWING STRAP

(76) Inventor: Ronald C. Master, 1919 Cherry Valley Rd., Woodstock, IL (US) 60098

( * ) Notice: Subject to any disclaimer, the term of this patent is extended or adjusted under 35 U.S.C. 154(b) by 0 days.

(21) Appl. No.: 10/838,574

(22) Filed: May 4, 2004

(51) Int. Cl.
*B60D 13/00* (2006.01)

(52) U.S. Cl. ...................... 280/480; 414/462

(58) Field of Classification Search ............ 280/480, 280/482, 483; 224/537; 414/462
See application file for complete search history.

(56) References Cited

U.S. PATENT DOCUMENTS

| | | | |
|---|---|---|---|
| 3,547,456 A * | 12/1970 | Sapp | 280/19 |
| 3,710,999 A | 1/1973 | Allen | |
| 3,800,990 A | 4/1974 | Richardson | |
| 4,009,897 A | 3/1977 | Spellman | |
| 4,413,851 A | 11/1983 | Ritter | |
| 4,759,559 A | 7/1988 | Moulton | |
| 5,263,745 A * | 11/1993 | Storey | 280/483 |
| 5,437,401 A * | 8/1995 | Seltzer | 224/578 |
| 5,711,543 A | 1/1998 | Stokes | |
| 5,806,738 A | 9/1998 | D'Angelo | |
| 6,092,826 A * | 7/2000 | Pingel et al. | 280/480.1 |
| 6,361,264 B1 | 3/2002 | Guthrie et al. | |
| 6,409,188 B1 | 6/2002 | Hesmer | |
| 6,618,981 B1 * | 9/2003 | Rodriguez | 43/54.1 |
| 2005/0023796 A1 * | 2/2005 | Rasmussen | 280/400 |

* cited by examiner

*Primary Examiner*—Tony Winner
(74) *Attorney, Agent, or Firm*—Mathew R. P. Perrone, Jr.

(57) ABSTRACT

A towing strap has two ends, which may be permanently or releasably attached to an item to be towed. Each strap end which is releasably attached, includes a fastening mechanism, which permits a person to attach towing strap to the item to be towed. The permanent straps are molded, glued, or otherwise secured to the item to be towed.

13 Claims, 4 Drawing Sheets

TOWING STRAP

This invention relates to a towing strap, and more particularly, to a towing strap adapted for removably securing or permanently securing to an object, which requires towing.

BACKGROUND OF THE INVENTION

Many items can be too heavy to be easily moved. When that occurs, it is very desirable to have those items be made more easily movable. To that end, many items have wheels mounted thereto. Even so, the presence of wheels does not necessarily solve the problem.

It then becomes necessary to provide a power source or propelling device to move the heavy item even with the wheels thereon. This requirement, in turn, leads to the desirability of being able to easily attach a towing strap to that heavy item, or to provide that heavy item with a towing strap as an integral part thereof.

Once the structure of a towing strap is determined, and that strap is placed in conjunction with any item, it then becomes necessary to secure that strap to a power source or towing device capable of towing that item. Thus, the towing strap must not only be attachable to a towable device, but it must also be attachable to a towing device.

As the ease of the attachment improves, the utility of the towing strap also improves. Ease of the attachment clearly supports ease of use. Thus, the towing strap must be easily attached to both a towable device and to a towing device. Such advantages are difficult to attain.

SUMMARY OF THE INVENTION

Among the many objectives of this invention is the provision of a towing strap, which is easily attached to both a towable device and to a towing device.

A further objective of this invention is the provision of a towing strap, which is easily released from a towable device.

Yet a further objective of this invention is the provision of a towing strap, which is easily released from a towing device.

A still further objective of this invention is the provision of a towing strap, which is easily installed.

Another objective of this invention is the provision of a towing strap, which is easily stored.

Yet another objective of this invention is the provision of a towing strap, which is easily folded.

Still, another objective of this invention is the provision of a towing strap, which has sufficient towing strength.

Also, an objective of this invention is the provision of a towing strap, which is easily attached to a towable device.

A further objective of this invention is the provision of a towing strap, which is easily attached to a towing device.

These and other objectives of the invention (which other objectives become clear by consideration of the specification, of claims and drawings as a whole) are met by providing a towing strap having a flexible u-shape, wherein the base of the u-shape is secured to a towing device, while the arms of the u-shape are secured to a towable device.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

In accordance with this invention, a U-shaped towing strap is provided. The base of the U-shaped towing strap is releasably secured to a towing device. The arms of the U-shaped towing strap are securable to a towable device. The arms may be permanently or releasably secured to the towable device.

Preferably, the U-shaped towing strap is made from a thin, strong, flat flexible material. With the base of the U-shaped widespread being flexible, it may be easily secured to an appropriate towing vehicle. With the arms of U-shaped joint strap having the same qualities due to being the same material, each arm may be easily secured to any towable device, preferably a towable device with wheels.

Typical towable devices include trash cans, human waste receptacles such as those used at a campground, or any heavy device with wheels which needs to be moved. The U-shaped towing strap, for permanent attachment purposes, may be glued, welded, molded or shaped as a part of the towable device.

If the U-shaped towing strap is removably attached to the towable device, a fastening device is placed at the end of each arm. Each arm may then be secured to a towable device, by looping through a handle and fastening the arm on itself with the handle in or through the loop. The towable device may also have a corresponding fastening device with the towing strap if desired, especially if there are handles for a loop.

Fastening devices are preferably temporary, but can be permanent. Snaps, a hook and loop assembly, a knot assembly, a button and button hole assembly or other fasteners may be used.

A standard hook and loop assembly is available as a registered trademark VELCRO, owned by Velcro Industries B.V. LIMITED LIABILITY COMPANY NETHERLANDS Castorweg 22–24 Curacao NETHERLANDS ANTILLES.

Figure 1:
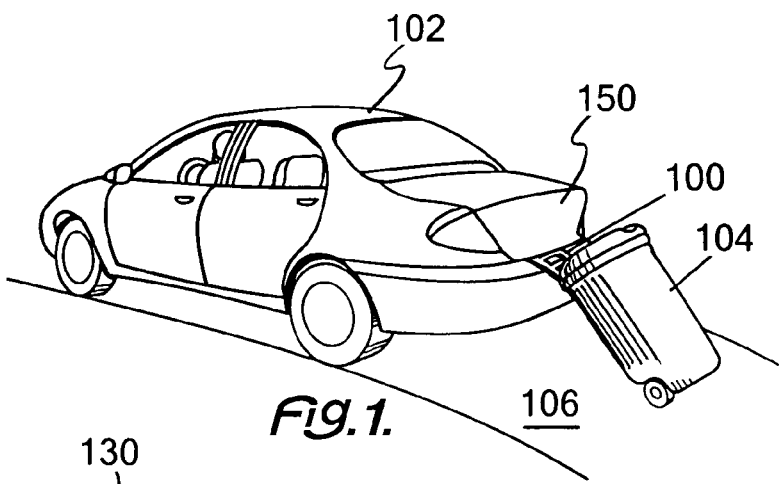
FIG. 1 depicts a perspective view of a towing strap 100 of this invention positioned between a vehicle 102 and a trash receptacle 104 for towing the trash receptacle.

Referring now to FIG. 1, a towing strap 100 is secured between a vehicle 102 and a trash receptacle 104. In other words, towing strap 100 is secured by trunk lid 150 of vehicle 102 and at the opposite end to trash receptacle 104. Vehicle 102 may then use towing strap 100 for moving trash receptacle 104 along driveway 106.

Figure 2:
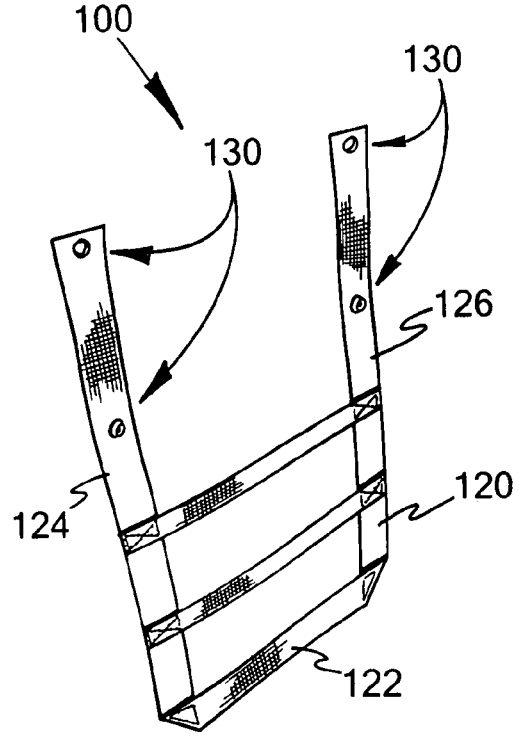
FIG. 2 depicts a perspective view of the towing strap 100 of this invention.

Adding FIG. 2 to the consideration, towing strap 100 has a flexible U-shaped member 120. U-shaped member 120 has a base 122 with a first arm 124 and a second arm 126 extending therefrom. Adjacent to the end of both first arm 124 and second arm 126 is a fastening device such as snap assembly 130.

Figure 3:
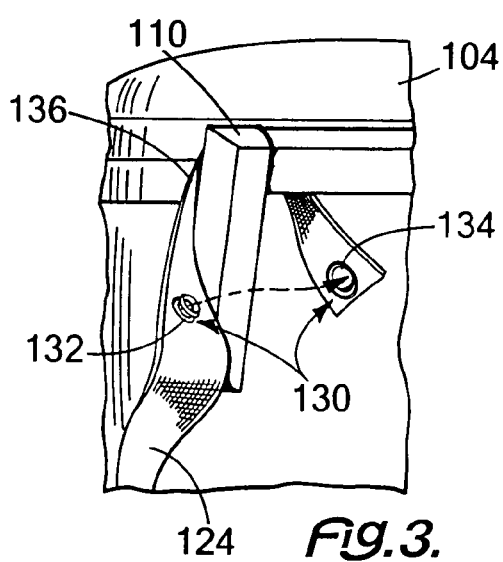
FIG. 3 depicts a close-up perspective view of the towing strap 100 of this invention being secured to a trash receptacle 104.
Figure 4:
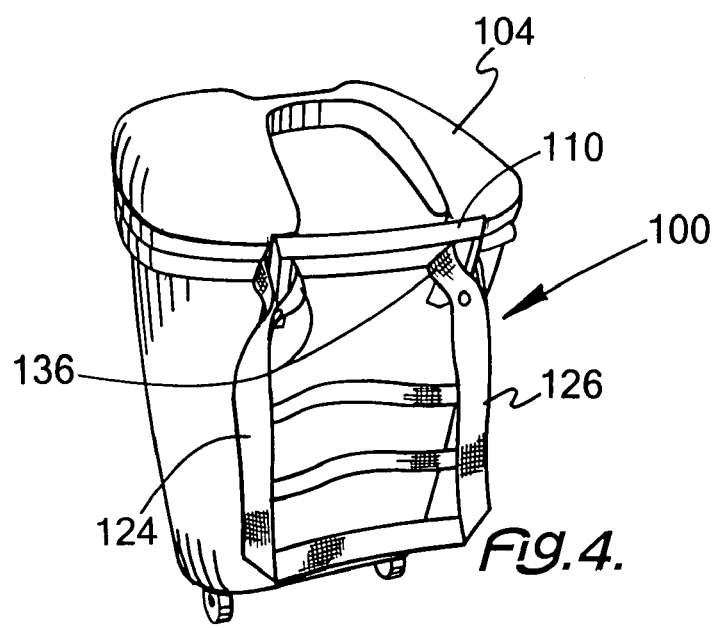
FIG. 4 depicts a perspective view of the towing strap 100 of this invention while secured to a trash receptacle 104.

Turning now to FIG. 3 and FIG. 4 to the consideration, the depicted fastening device is the snap assembly 130. Snap assembly 130 has a male snap 132 and a female snap 134 positioned on both of first arm 124 and second arm 126. As male snap 132 and female snap 134 are brought together, a loop 136 is formed with handle 110 of trash receptacle 104 contained therein.

Figure 5:
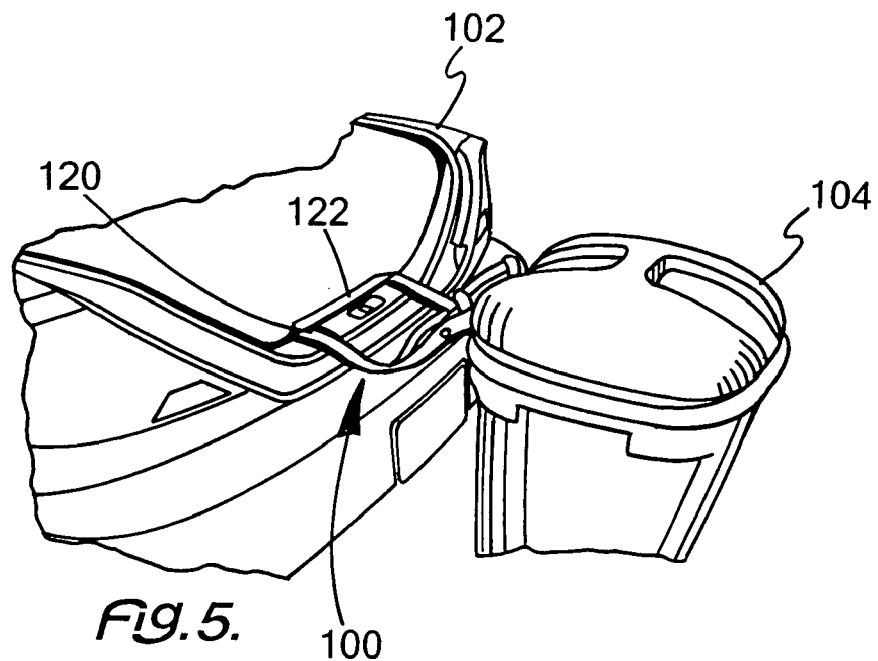
FIG. 5 depicts a perspective view of the towing strap 100 of this invention while secured to a trash receptacle 104 and being secured to vehicle 102.

Use of towing strap 100 is explained by FIG. 5, after the illustrated procedures of FIG. 3 and FIG. 4 are accomplished. U-shaped member 120 has base 122 secured to vehicle 102 by raising trunk lid 150 of FIG. 1, inserting base 122 therein, and closing trunk lid 150 of FIG. 1.

Figure 6:
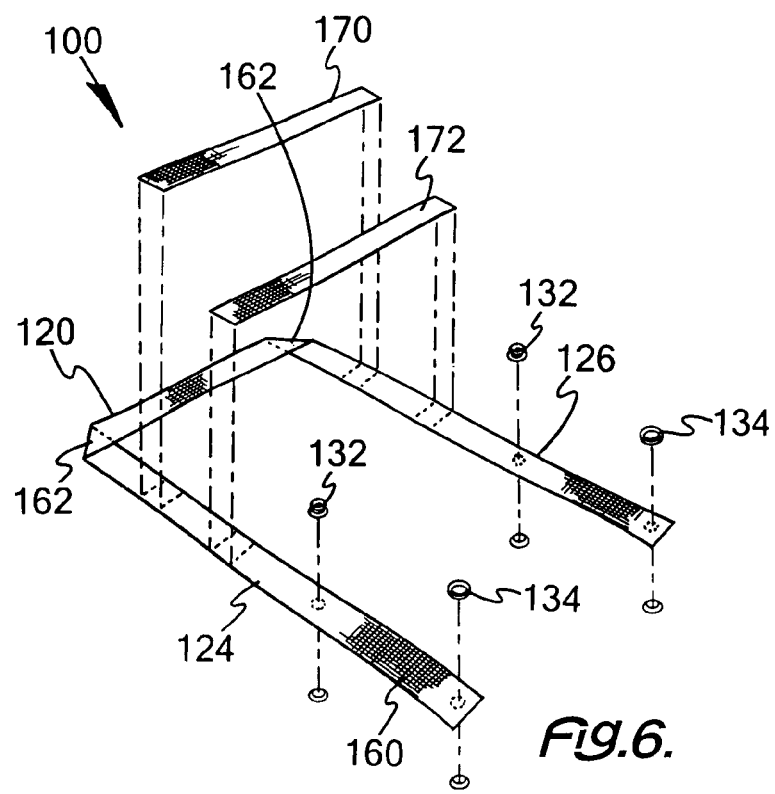
FIG. 6 depicts an exploded, perspective view of the towing strap 100.

The structure of towing strap 100 is explained by FIG. 6. In this exploded view, formation of U-shaped member 120 is accomplished by folding flat material 160 of towing strap 100 and forming the ninety degree fold 162 from the flat material 160. If desired, a first cross strap 170 and a second cross strap 172 may be glued, sewn, fused, welded or otherwise secured to towing strap 100.

Secured to both first arm 124 and second arm 126 is snap assembly 130. Each snap assembly 130 includes a male snap member 132 and a female snap member 134. Insertion of male snap member 132 into female snap member 134 can form loop 136 with handle 110 therein.

First cross strap 170 is connected to first arm 124 and second arm 126. Second cross strap 172 may also be so connected. Both first cross strap 170 and second cross strap 172 provide reinforcement for towing strap 100. First cross strap 170 and second cross strap 172 may be used together or separately.

Figure 7:
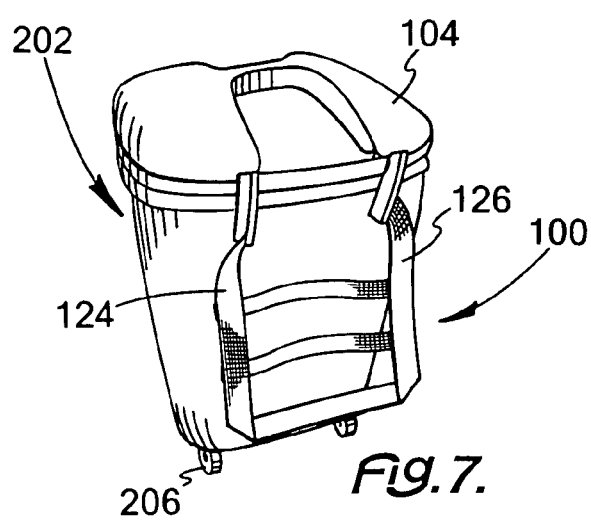
FIG. 7 depicts a perspective view of the towing strap 100 of this invention permanently secured to a trash receptacle 104.

With FIG. 7, it becomes clear that towing strap 100 may be permanently secured to a trash receptacle 104. First arm 124 and second arm 126 are glued, sewn, fused, welded or otherwise secured to trash receptacle 104. These procedures provide for towing strap 100 to be permanently secured to trash receptacle 104 or other towable device 202. The towable device 202 preferably is a device mounted on wheels 206, although the towable device 202 can also be dragged or skidded.

Figure 8:
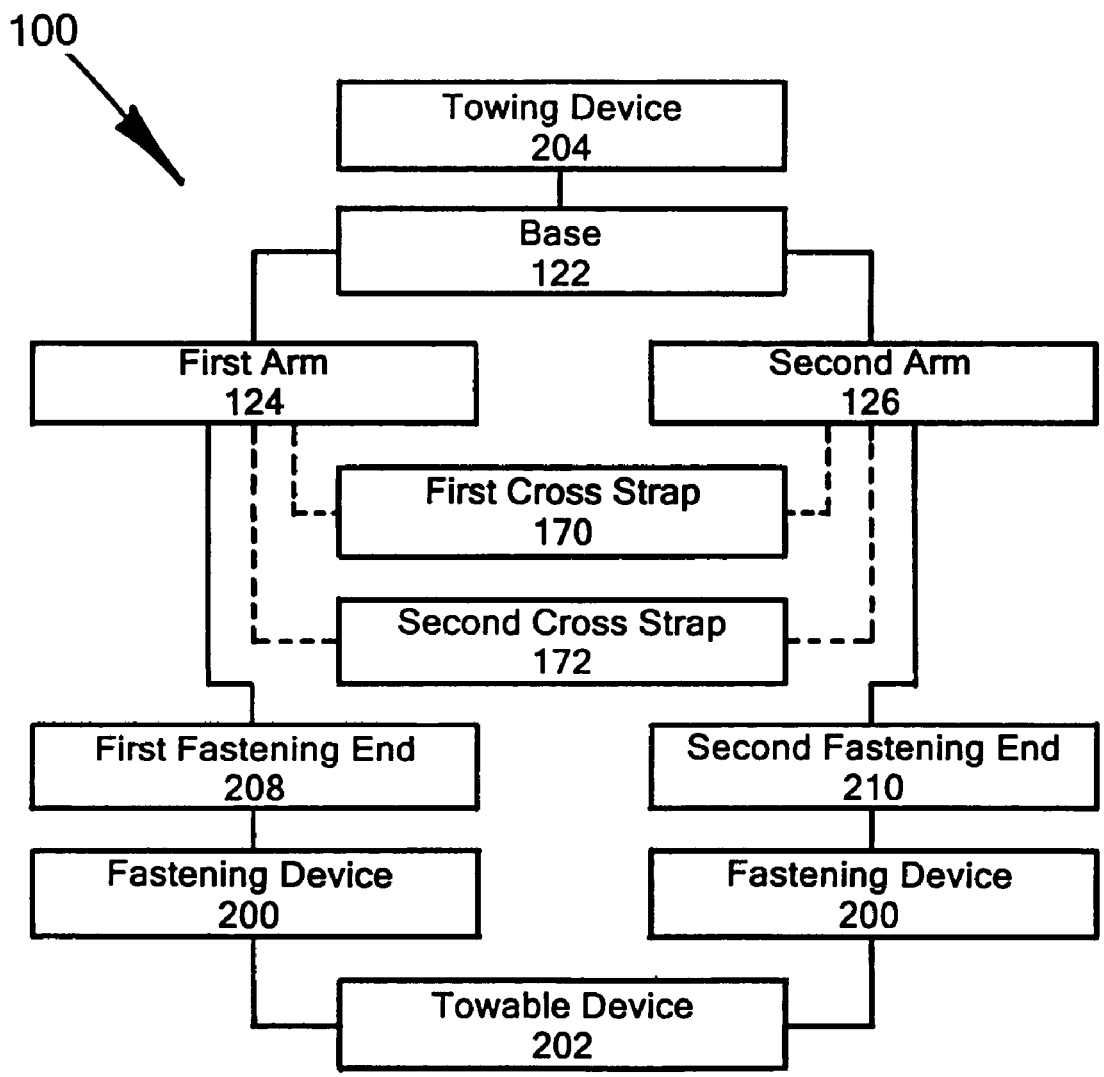
FIG. 8 depicts a block diagram of the towing strap 100 of this invention as it may be used.

FIG. 8 provides a block diagram of towing strap 100 in order to provide for a variety of structures and replacements for snap assembly 130. The fastening device 200 on first arm 124 and second arm 126 may include the snap assembly 130, a hook and loop assembly, or any other device capable of forming the desired loop such as loop 136 (FIG. 3).

Fastening device 200 may also be provided by being glued, sewn, fused, welded or otherwise secured to towable device 202 of FIG. 7, which may include trash receptacle 104 or other items. First arm 124 and second arm 126 with at least of first cross strap 170 and second cross strap 172 secured thereto each have a fastening end. First arm 124 has a first fastening end 208. Second arm 126 has a second fastening end 210. First fastening end 208 and second fastening end 210 are separately glued, sewn, fused, welded or otherwise secured to towable device 202 of FIG. 7.

After towing strap 100 is thus attached to towable device 202, U-shaped base 122 may be releasably attached to a towing device 204. Towing device 204 may be vehicle 102 of FIG. 1 or any other suitable device to which U-shaped base 122 may be releasably attached. Vehicle 102 may be any suitable automobile, pickup truck or the like. Base 122 may be secured in a trunk lid 150 (FIG. 1) or over a trailer hitch on a vehicle. The trunk lid 150 provides a more secure system.

For example, towing device 204 may be a simple machine or a complicated machine. Typical machines include an automobile, a truck, a bicycle or a similar device. Critical for the towing device 204 is that it provides a mechanical advantage to the use of the towing strap 100.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A towing strap being easily attachable to a towing device and a towable device comprising:
   (a) a flexible u-shaped material having a base with a pair of arms extending therefrom;
   (b) at least one reinforcing strap connecting the arms;
   (c) the base being securable to a towing device;
   (d) the pair of arms being securable to a towable device;
   (e) the flexible u-shaped material being a flat strap;
   (f) the pair of arms including a first arm and a second arm;
   (g) the first arm including a first fastening device;
   (h) the second arm including a second fastening device;
   (i) the first fastening device being a first releasable fastening device;
   (j) the second fastening device being a second releasable fastening device;
   (k) the first releasable fastening device being securable to the towable device;
   (l) the second releasable fastening device being securable to the towable device;
   (m) the towable device having a first handle and a second handle;
   (n) the first releasable fastening device forming a first loop in the first arm;
   (o) the second releasable fastening device forming a second loop in the second arm;
   (p) the first loop being adapted to receive the first handle; and
   (q) the second loop being adapted to receive the second handle.

2. The towing strap of claim 1 further comprising:
   (a) the first fastening device being a first permanent fastening device secured to the towable device; and
   (b) the second fastening device being a permanent fastening device secured to the towable device.

3. The towing strap of claim 2 further comprising:
   (a) the towable device having wheels; and
   (b) the towing device being a vehicle.

4. The towing strap of claim 3 further comprising the towable device being a trash can.

5. The towing strap of claim 1 further comprising:
   (a) the at least one reinforcing strap being a first reinforcing strap and a second reinforcing strap;
   (b) the base being substantially parallel to the first reinforcing strap and the second reinforcing strap; and
   (c) the pair of arms being substantially perpendicular to the first reinforcing strap and the second reinforcing strap.

6. The towing strap of claim 5 further comprising the first releasable fastening device and the second releasable fastening device being at least one device selected from the group consisting of a snap assembly, a hook and loop assembly, a knot assembly, and a button and button hole assembly.

7. A method for towing a towable device with a towing device comprising:
   (a) providing a U-shaped towing strap formed from a flexible u-shaped material having a base with a pair of arms extending therefrom with at least one reinforcing strap connecting the pair of arms;
   (b) attaching the pair of arms to the towable device;
   (c) attaching the base to the towing device;
   (d) permanently or releasably attaching the pair of arms to the towable device;
   (e) the towable device being a trash can with wheels;
   (f) the towing device being a vehicle with a trunk; and
   (g) securing the base in the trunk.

8. The method of claim 7 further comprising releasably attaching the pair of arms to the towable device with a fastening device selected from the group consisting of a hook and loop assembly, a snap assembly, a knot assembly, and a button assembly.

9. The method of claim 8 further comprising:
   (a) forming a loop with the fastening device at the end of each arm to be secured to a towable device;
   (b) placing the loop through a handle on the towable device; and
   (c) fastening the arm on itself.

10. The method of claim 8 further comprising;
    (a) forming a loop with the fastening device at the end of each arm to be secured to a towable device;
    (b) placing the loop in a handle on the towable device; and
    (c) fastening the arm on itself.

11. A towing strap being easily attachable to a towing device and permanently attached to a towable device comprising:
    (a) a flexible u-shaped material having a base with a pair of arms extending therefrom;
    (b) at least one reinforcing strap connecting the arms;
    (c) the base being securable to a towing device;
    (d) the pair of arms being permanently secured to a towable device;
    (e) the flexible u-shaped material being a flat strap;
    (f) the pair of arms including a first arm and a second arm;
    (a) the towable device having wheels; and
    (h) the towing device being a vehicle.

12. The towing strap of claim 11 further comprising the towable device being a trash can.

13. The towing strap of claim 11 further comprising:
    (a) the at least one reinforcing strap being a first reinforcing strap and a second reinforcing strap;
    (b) the base being substantially parallel to the first reinforcing strap and the second reinforcing strap; and
    (c) the pair of arms being substantially perpendicular to the first reinforcing strap and the second reinforcing strap.

* * * * *